(12) United States Patent
Gu et al.

(10) Patent No.: US 8,346,213 B2
(45) Date of Patent: Jan. 1, 2013

(54) METHOD OF PROTECTING AT COMMANDS

(75) Inventors: Xiangxin Gu, Shanghai (CN); Ling Lv, Shanghai (CN); Rui Zhong, Shanghai (CN); Hui Miao, Shanghai (CN)

(73) Assignee: Spreadtrum Communications (Shanghai) Co., Ltd., Pudong District, Shanghai (CN)

( * ) Notice: Subject to any disclaimer, the term of this patent is extended or adjusted under 35 U.S.C. 154(b) by 911 days.

(21) Appl. No.: 12/274,497

(22) Filed: Nov. 20, 2008

(65) Prior Publication Data

US 2009/0131033 A1 May 21, 2009

(30) Foreign Application Priority Data

Nov. 20, 2007 (CN) .......................... 2007 1 0170642

(51) Int. Cl.
*H04M 1/66* (2006.01)

(52) U.S. Cl. ........ 455/410; 455/418; 455/466; 713/151; 709/224

(58) Field of Classification Search .................. 455/418; 713/151; 709/224
See application file for complete search history.

(56) References Cited

U.S. PATENT DOCUMENTS

| | | | | |
|---|---|---|---|---|
| 4,885,789 A * | 12/1989 | Burger et al. ................. | 713/164 |
| 5,212,774 A * | 5/1993 | Grider et al. .................. | 709/217 |
| 5,408,520 A * | 4/1995 | Clark et al. ................. | 379/93.07 |
| 5,463,633 A * | 10/1995 | Lopez-Ramirez ............. | 714/714 |
| 5,682,475 A * | 10/1997 | Johnson et al. .................. | 726/18 |
| 5,809,118 A * | 9/1998 | Carmello et al. ........ | 379/102.02 |
| 6,469,891 B1 * | 10/2002 | Takita et al. ............... | 361/679.4 |
| 6,671,522 B1 * | 12/2003 | Beaudou ....................... | 455/558 |
| 6,973,567 B1 * | 12/2005 | Riley et al. ..................... | 713/151 |
| 7,627,022 B2 * | 12/2009 | Monroe et al. ................. | 375/222 |
| 2003/0233450 A1* | 12/2003 | Carley ............................ | 709/224 |
| 2005/0135373 A1* | 6/2005 | Ramji ......................... | 370/395.2 |
| 2006/0105809 A1* | 5/2006 | Luo ................................ | 455/558 |
| 2010/0223183 A1* | 9/2010 | Smith ............................. | 705/44 |

* cited by examiner

*Primary Examiner* — Charles Shedrick

(57) ABSTRACT

A method of protecting AT commands during the interaction between the AT command module of a mobile terminal and the serial communication unit of an external device, comprising the steps of: receiving AT command from the serial communication unit to the AT command module at an initial state; putting the AT command module into an ID verification mode, wherein the AT command module receives a username and password from the serial communication unit in turn, and verifies said received username and password; and putting the AT command module into an AT command processing state, when the ID verification is successful. Therefore, it's impossible for an illegal user to take the control of the mobile terminal through AT command.

12 Claims, 5 Drawing Sheets

METHOD OF PROTECTING AT COMMANDS

BACKGROUND OF THE PRESENT INVENTION

1. Field of Invention

The present invention relates to a method of protecting AT commands when a terminal device sends AT command to a terminal adapter via serial interface, and more particularly to a method of protecting AT commands when a computer sends AT command to a mobile terminal via serial interface.

2. Description of Related Arts

As a way of communication, a computer sends AT command to a mobile terminal via serial interface to control the mobile terminal through AT command, so as to realize the GSM/UMTS interaction. The user can operate or control the function configuration, call, short message, phonebook, data service, fax, etc. through AT command.

At present, the security of the mobile terminal is getting more and more attention. Security protections are considered in many aspects, but less is considered on AT command. In fact, AT command can not only control GSM related services, such as call services, SMS (Short Message Service), supplementary services and GPRS data services, but also control the functions of mobile terminal, such as operating phonebook, getting IMEI. It's easy for an illegal user to take the control of the mobile terminal without the security protection to the AT commands, which is a hidden trouble.

SUMMARY OF THE PRESENT INVENTION

An object of the present invention is to provide a method of protecting AT commands by adding an ID verification function to the AT command, so as to prevent the illegal user from controlling the mobile terminal through AT command.

Accordingly, in order to accomplish the above object, the present invention provides a method of protecting AT commands during the interaction between the AT command module of a mobile terminal and the serial communication unit of an external device, comprising the steps of:

(1) receiving AT command from the serial communication unit to the AT command module;

(2) putting the AT command module into an ID verification mode, wherein the AT command module receives a username and password from the serial communication unit in turn, and verifies said received username and password;

(3) putting the AT command module into an AT command processing state, when the ID verification is successful.

When the ID verification is unsuccessful, put the AT command module into an initial state or a username input state.

Wherein step (2) comprises steps of: (a) sending information for prompting a user to input a username, and entering into a username input state; (b) receiving a character string from the serial communication unit, remotely processing display of the character string according to a flag variable so as to display the original inputted character string, and recording the character string as username; (c) sending information for prompting a user to input a password, and entering into a password input state; and (d) receiving a character string from the serial communication unit, remotely processing display of the character string according to a flag variable so as to hide the inputted character string, and recording the character string as password.

In a embodiment, both step (b) and (d) comprise steps of: reading the received character from a receiving buffer; determining whether the received character is password according to the flag variable; when the received character is password, sending a hidden character to the serial communication unit; when the received character is not password, sending the original character back to the serial communication unit. The hidden character may be "*".

In another embodiment, both step (b) and (d) comprise steps of: reading the received character from a receiving buffer in turn; determining whether the received character is password according to the flag variable; when the received character is password, determining whether the character is special character; when the character is not special character, sending a hidden character to the serial communication unit, while when character is special character, not sending a hidden character to the serial communication unit; when the received character is not password, sending the original character back to the serial communication unit.

In another embodiment, both step (b) and (d) comprise steps of: reading the received character from a receiving buffer in turn; determining whether the received character is password according to the flag variable; when the received character is password, determining whether the character is special character; when the character is not special character, sending a hidden character to the serial communication unit, while when character is special character, setting the flag variable to a non-password state; when the received character is not password, sending the original character back to the serial communication unit.

The special character includes an enter sign and/or a newline sign.

In another embodiment, both step (b) and (d) comprise steps of: reading the received character from a receiving buffer in turn; determining whether the received character is password according to the flag variable; when the received character is password, sending a Backspace and a hidden character to the serial communication unit.

Step (c) further comprises a step of setting the flag variable to a password state. Step (d) further comprises a step of setting the flag variable to a non-password state.

In step (b) and (d), the AT command module receives the character string via an interrupt processing module, wherein step (2) is implemented by the interrupt processing module.

The step of verifying the received username and password comprises steps of: comparing the received username to a username database to check whether the username exists; when the username exists, and verifying whether a corresponding password is identical to the received password, wherein when the passwords are identical, ID verification is successful, and when the username does not exist or the passwords are not identical, ID verification is unsuccessful.

Therefore, the present invention provides a method of protecting an operation authority of the AT commands via ID verification so as to protect the mobile terminal from being controlled by unauthorized user or software. The local echo problem in the ID verification is solved by changing the partial configuration of the mobile terminal without modifying the serial communication software. The password is hidden in the ID verification process and the username and AT command is normally displayed.

These and other objectives, features, and advantages of the present invention will become apparent from the following detailed description, the accompanying drawings, and the appended claims.

DETAILED DESCRIPTION OF THE PREFERRED EMBODIMENT

Figure 1:
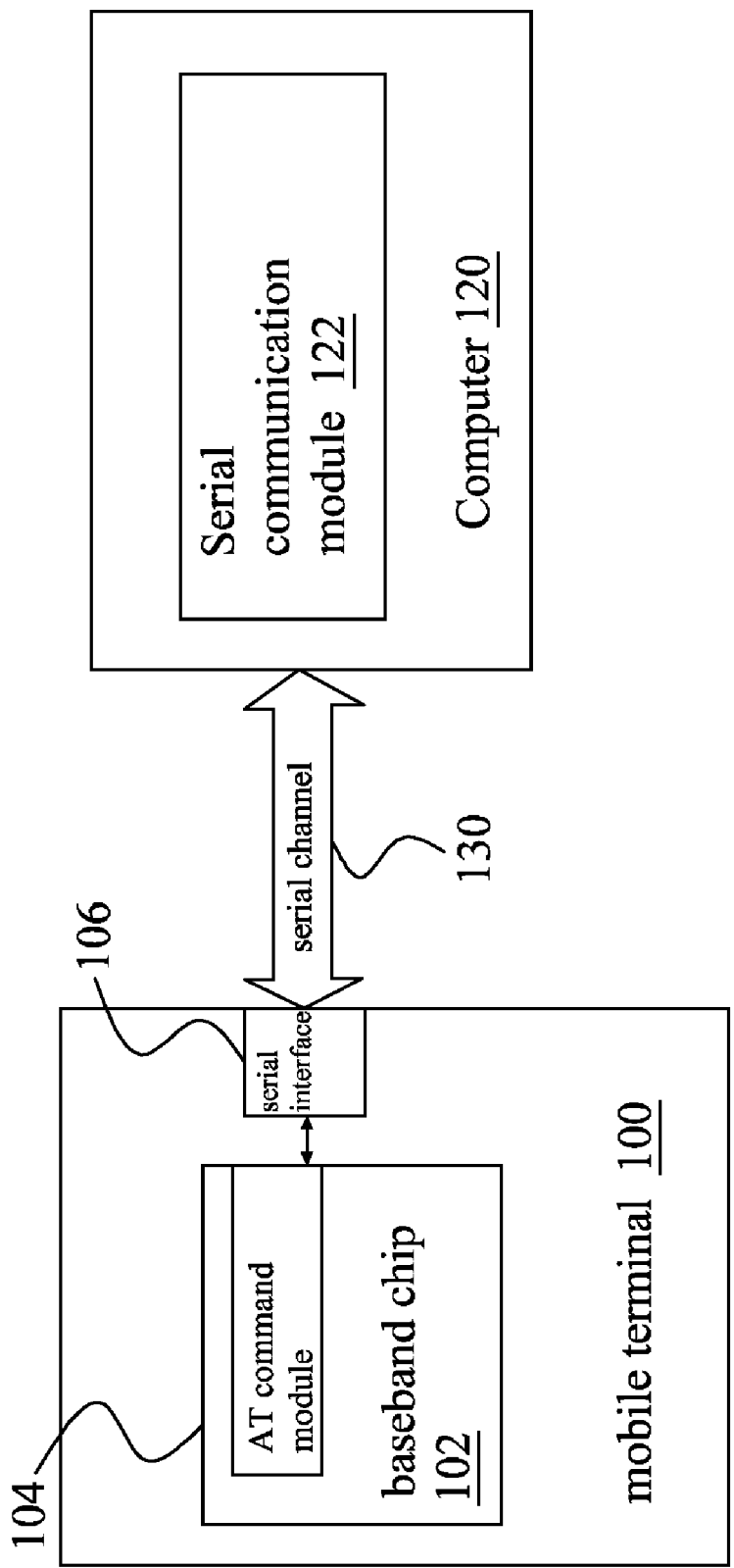
FIG. 1 is a schematic view of a serial communication between a computer and a mobile terminal.

The serial communication unit of an external device can communicate with the serial interface of a mobile terminal via a serial channel. Referring to FIG. 1 of the drawings, take a PC 120 as the external device for example to illustrate the present invention in this preferred embodiment, and the serial communication unit is performed by the serial communication software 122. However, the person skilled in the art understands the patent scope is not limited to these examples. Any electric device that can provide serial communication function and can interactive with the subscriber can be taken as the external device.

The mobile terminal 100 comprises an AT (Attention) command module 104 inside, which is, for example, integrated into the baseband chip 102 of the mobile terminal, and connected to the serial interface 106 of the mobile terminal 100. Thus, being sent to the serial interface 106 of the mobile terminal 100 via serial channel 130, AT (Attention) command performs various operations on it, such as call services, SMS (Short Message Service), supplementary services and GPRS data services, and various functions for controlling the mobile terminal, such as operating phonebook, getting IMEI, and so on.

In one embodiment of the present invention, an ID verification function for the user is added to the mobile terminal, so that an unauthorized user or software can not control the mobile terminal via AT command. For example, at an initial state when the mobile terminal is turned on, the AT command module 104 receives an AT command (may be inputted by the user) from the serial communication software 122. The AT command module does not analyze and implement the AT command at the moment, but enters into an ID verification mode first. In this mode, the AT command module 104 requests the user to input username and password. After receiving the username and password, the AT command module 104 verifies them. If the verification is successful, the AT command module enters in a normal state of implementing the AT commands; if the verification is unsuccessful, the AT command module turns back to the initial state of not implementing AT command when receiving it. This verification mode can protect the mobile terminal from being controlled by unauthorized user and software. In addition, when the verification is unsuccessful, the AT command module can also enter into a username input state for prompting the user to input username.

Figure 2:
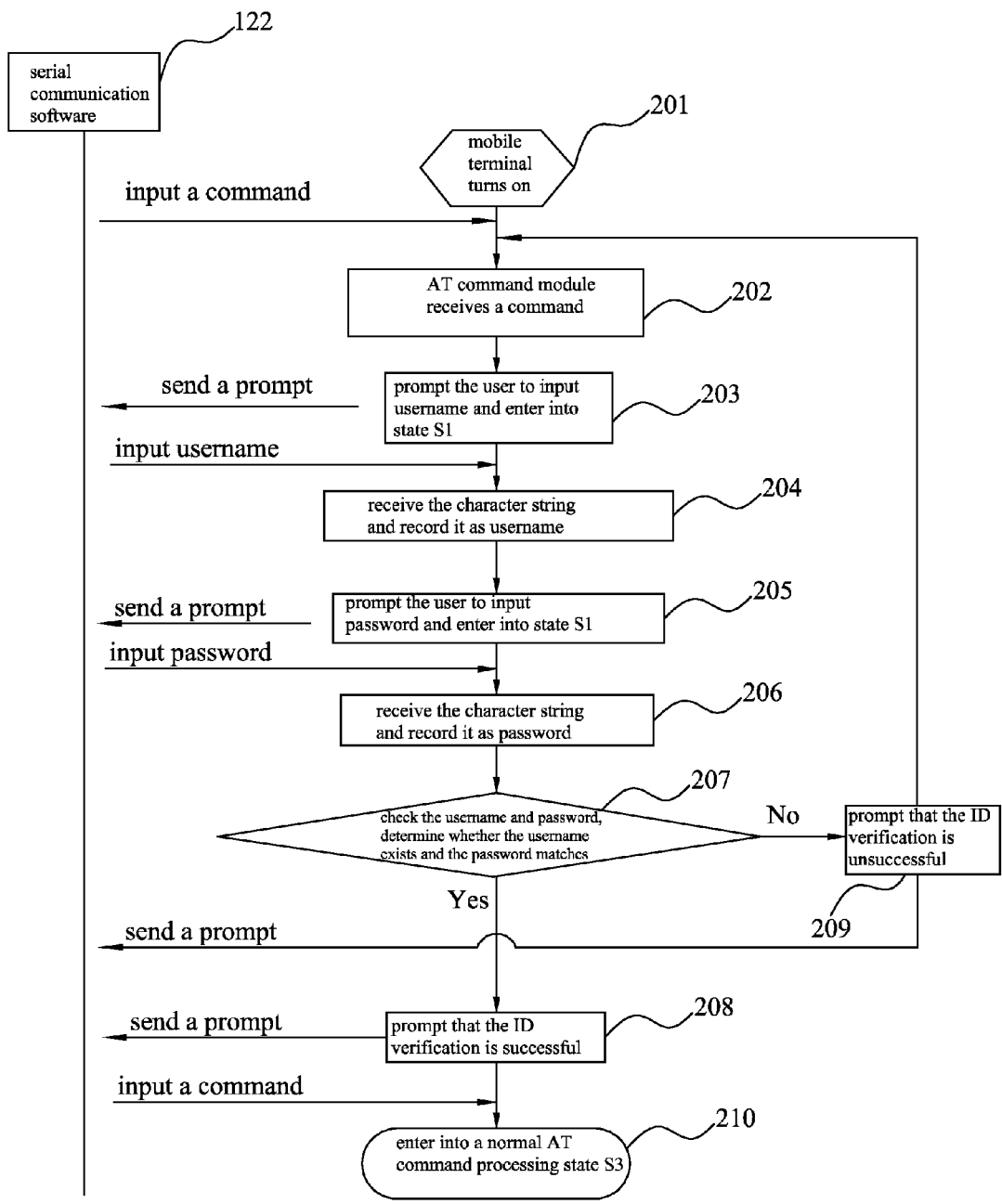
FIG. 2 is a flow chart of a method of protecting AT commands according to a preferred embodiment of the present invention.

FIG. 2 is a flow chart illustrating a method for protecting the AT commands according to a preferred embodiment of the present invention. In step 201, both the mobile terminal 100 and the serial communication software 122 are turned on and connected with each other. The mobile terminal 100 is in an initial state S0. When a user wants to control the mobile terminal, he or she will input a command via the serial communication software 122. The command includes, but not limited to, the AT command. The characters coming from the serial communication software 122 including Enter can be deemed as a command to actuate the AT command module 104. In step 202, If the AT command module 104 of the mobile terminal 100 receives command at the initial state S0, it will not analyze and implement the commend, but enter into the ID verification program to implement step 203 to 209, which is described in detail below.

In step 203, the AT command module 104 requests the user to input the username. The AT command module 104 sends an information for prompting the user to input username to the serial communication software 122, and then the AT command module 104 enters into a username input state S1 to wait for the user to input username. The serial communication software 122 prompts the user to input the username on the user interface of the computer 100. After the username is inputted, the serial communication software 122 sends the username to the mobile terminal 100. In step 204, the AT command module 104 in the username input state S1 receives the character string, and records the character string as the username.

In step 205, the AT command module 104 requests the user to input the password. The AT command module 104 sends an information for prompting the user to input password to the serial communication software 122, and then the AT command module 104 enters into a password input state S2 to wait for the user to input password. The serial communication software 122 prompts the user to input the password on the user interface of the computer 100. After the password is inputted, the serial communication software 122 sends the password to the mobile terminal 100. In step 206, the AT command module 104 in the password input state S2 receives the character string, and records the character string as the password.

Then in step 207, check whether the inputted username exists by comparing to a username database. If the username exists, check whether its password is identical to the received password. If the two passwords are identical, implement step 208 to prompt that the ID verification is successful. Afterward, when receiving the AT command again, the AT command module 104 enters in a normal AT command processing state S3 (step 210), not to the ID verification mode again. If the username does not exist, or the two passwords are not identical, the AT command module 104 enters in step 209 to prompt that the ID verification is unsuccessful, and returns back to the initial state S0.

Alternatively, the step of checking whether the username exists in step 207 can also be implemented just after the step 204 of recording the username. When the username is incorrect, indicate the username is wrong, and return back to step 203 to prompt the user to re-input the username.

Figure 3:
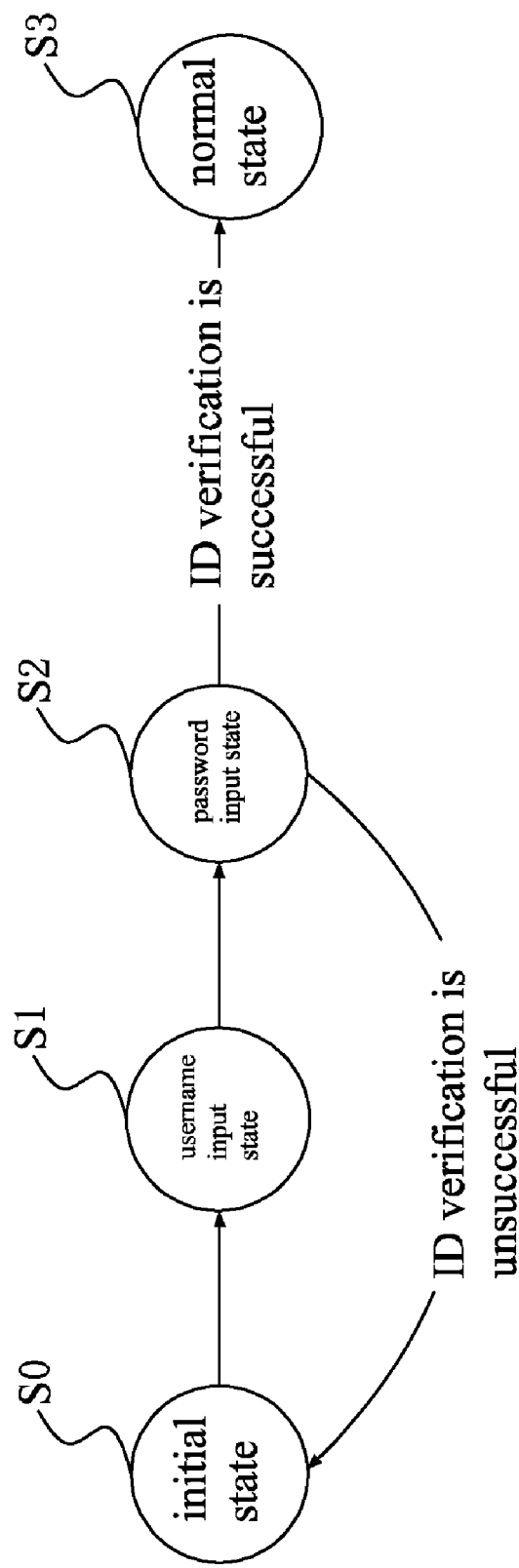
FIG. 3 is a schematic view showing the states set to the AT command module.

As shown in FIG. 3, in order to determine which state the ID verification is in, a state variable is provided in the AT command module 104 to record the above states S0 to S3. The initial state when the mobile terminal is turned on is S0. In this state, the AT command module 104 receives information and implements the step 203, and sets the state variable to the username input state S1. In the username input state S1, implement step 204 and 205, and set the state variable to the username input state S1. In the username input state S1, implement step 207. If the ID verification is successful, set the state variable to normal processing state S3, or return to the initial state S0.

The user uses the serial communication software 122 of the computer 100 to control the serial interface to send and receive the AT command. The universal serial communication software, such as the Windows Hyper Terminal, usually can set or unset Local Echo. If the Local Echo is set, the inputted password displays on the screen, so that it can be easily seen by others. If the Local Echo is unset, it is inconvenient to input the username and the AT command.

In the preferred embodiment of the present invention, the password is hidden by changing the configuration of the mobile terminal without modifying the serial communication software 122. The concept of the present invention is to unset Local Echo to the serial communication software 122, and all displays on the computer are received from the mobile terminal. Under normal conditions, the mobile terminal sends back every character when receives one respectively, so that the user can see the inputted character. In the password input state, the mobile terminal sends back a "*" after receiving each character respectively. After the password is inputted, the mobile terminal returns to the normal condition to send back every character when receives one respectively.

Accordingly, during the step 204 to 206 implemented by the AT command module, the present invention further includes a step of remotely processing the display of the received character string (username character string and password character string) according to a flag variable, which is including steps of: reading the received character in turn from the receiving buffer; determining whether each character is password according to the flag variable; if yes, such as Flag=1, sending a hidden character, such as a "*", to the serial communication software 122 by writing the hidden character into the sending buffer; or, such as Flag=0, sending the received character back to the serial communication software 122 by writing the received character into the sending buffer. Wherein after the remote display process in step 204, set the flag variable to a password state, such as 1, and after the remotely display process in step 206, set the flag variable to a non-password state, such as 0. Therefore, in step 204, the Flag variable is in a non-password state that is normal state, send the originally inputted character back, and in step 206, the Flag variable is set to a password state, send a "*" back to hide the password.

The remote display process can be accomplished by inserting an interrupt processing module into a serial interface. In the current mobile terminal, when receiving command, the serial interface 106 will send interrupt to the AT command module 104. When the serial interface 106 receives a character string larger than a threshold or the receiving timer times out (timing after receiving the character string), the interrupt is actuated. Determine whether there is an enter sign '\r' or an end sign '\0' in the receiving buffer. If yes, the interrupt processing module believes a string of AT commands are received, and informs the AT module to process the AT commands. The interrupt processing module can be modified to provide an interface function to the AT command module 104. The interface function can set a flag variable to indicate in which way the received character is displayed. For example, 1 indicate that the received character is the inputted password and the flag variable is in a password state, so that the mobile terminal sends back a "*" after receiving each character to the computer 120; 0 indicate that the received character is not the inputted password and the flag variable is in a non-password state, so that the mobile terminal sends the original character after receiving each character back to the computer 120. All modifications do not alter the original program. what is needed is to add a flow of the remote display process in the interrupt processing module. In addition, the time set in the receiving timer determines the maximum delay from the character input to the display in the serial communication software.

Figure 4:
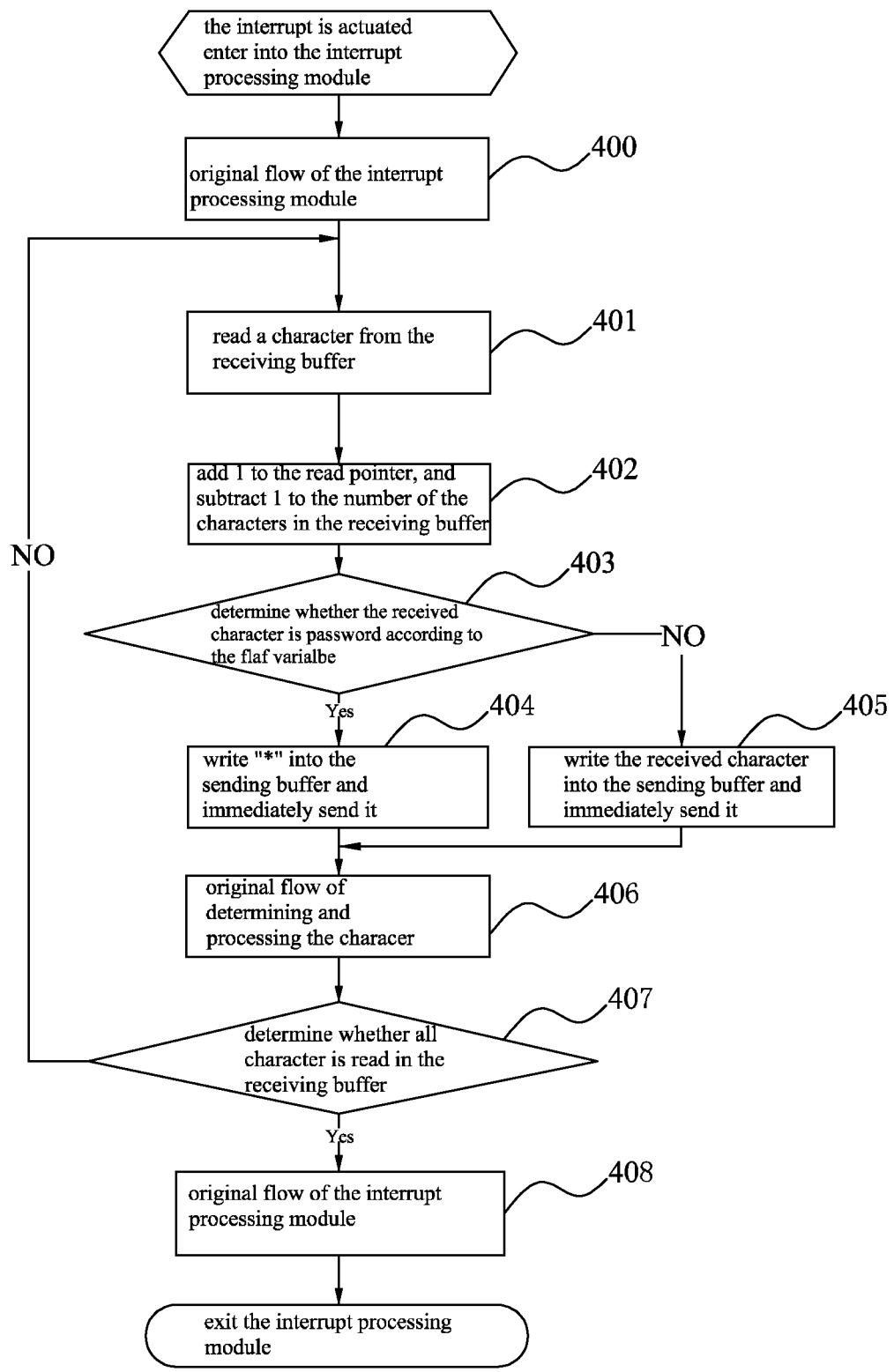
FIG. 4 is the flow chart of a remote display process in an interrupt processing module according to a preferred embodiment of the present invention.

A flow chart of the remote display process of a preferred embodiment is shown in FIG. 4. The steps 403 to 405 between the steps 400 to 402 and steps 406 to 408 can realize the remote display process of the interrupt processing module. Firstly, in step 401, read a character from a receiving buffer; then, in step 402, add 1 to the read pointer, and subtract 1 to the number of the characters in the receiving buffer; step 403, determine whether the received character is password; if yes, step 404, send a character "*"; if no, step 405, send back the original character; in step 406, if an "Enter" or a "\0" is encountered, inform AT command module 104 to process; in step 407, determine whether the receiving buffer is empty by checking whether the number of character in the receiving buffer is 0; if yes, step 408, exit the loop, and carry out the original flow in the interrupt processing module; if no, return to step 401.

It is worth mentioning that the step sequence of FIG. 4 is only for illustration. The person who skills in the art can change the step order without altering the objective of the remote display. For example, the implement order of the step 402, steps 403 to 405, and step 406 are changeable.

In the above flow, in the password state (Flag=1), the inputted "enter" will be displayed as "*". Accordingly, in the serial interface interrupt processing module, after the password input mode is determined in step 403 and before step 404, a step of determining the inputted character is inserted. If the received character is special character, such as "\r" (carriage return), or "\n" (line feed), the "*" is no longer displayed, so that the "enter" after the password is inputted will not be displayed as "*". Alternatively, in the serial interface interrupt processing module, if it is password input mode, a step of determining the inputted character is added. If the received character is special character, such as carriage return or line feed, directly set the flag variable to the non-password state (Flag=0), so that the "Enter" after the password is inputted will not be displayed as "*".

In the above embodiment, the flag variable for indicating whether the serial interface interrupt processing module works in the password state is not limited to 1-bit numbers, which can be more than 1-bit numbers, wherein one bit is used to indicate whether send back a "*" to the computer 120 when a character is received, and another is used to indicate whether send back the original character to the computer 120 when a character is received.

Figure 5:
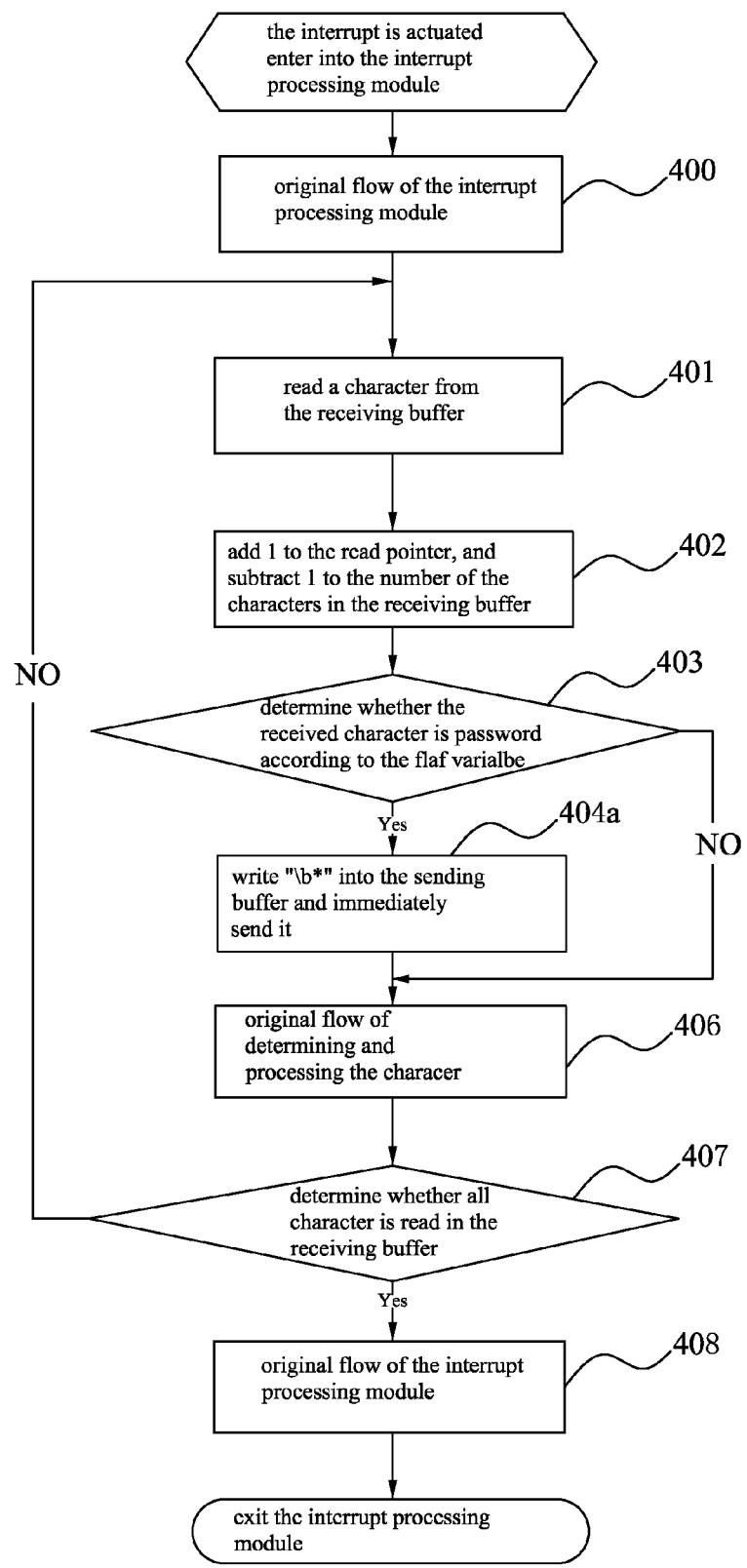
FIG. 5 is the flow chart of a remote display process in an interrupt processing module according to another preferred embodiment of the present invention.

FIG. 5 is a flow chart of another embodiment for remote display, which is described with FIG. 4. Different from the flow of FIG. 4, the serial communication software 122 can set Local Echo. When the mobile terminal determines that the inputted character is password according to the flag variable as step 403, implement 404*a*. In step 404*a*, send a "\b*" back to the serial communication software 122 when receive each password character, wherein "\b" is Backspace. That is to say use Backspace and hidden character "*" to replace the inputted password with "*". If the display speed is quick enough in the password input state, the local echo of the inputted password by the serial communication software 122 can be replaced very quickly, so that it is hardly recognized. When the mobile terminal determines that the inputted character is not password according to the flag variable as step 403, the mobile terminal will not send any character back to the serial communication software 122, so that the serial communication software 122 displays the inputted character on the user interface of the computer 100.

The present invention provides a method of protecting AT command operations by ID verification, so as to protect the mobile terminal from being controlled by unauthorized user of software. In order to solving the local echo problem, the present invention hides the password during the ID verification and displays the username and AT command normally by partially changing the configuration of the mobile terminal without modifying the serial communication software 122.

What is claimed is:

1. A method of protecting AT commands during the interaction between an AT command module of a mobile terminal and a serial communication unit of an external device, comprising the steps of:
   (1) receiving said AT commands from said serial communication unit to said AT command module;
   (2) putting said AT command module into an ID verification mode, wherein said AT command module receives a username and password from said serial communication unit in turn, and verifies said received username and password, comprising the steps of:
      (a) sending information for prompting a user to input a username, and entering into a username input state;
      (b) receiving a character string from said serial communication unit, remotely processing display of said character string according to a flag variable so as to display said inputted character string, and recording said character string as a username;
      (c) sending information for prompting a user to input a password, and entering into a password input state; and
      (d) receiving a character string from said serial communication unit, remotely processing display of said character string according to a flag variable so as to hide said inputted character string, and recording said character string as password; and
   (3) when said ID verification is successful, putting said AT command module into an AT command processing state, wherein both step (b) and (d) comprise steps of:
   reading said received character from a receiving buffer; and
   determining whether said received character is password according to said flag variable; when said received character is password, sending a hidden character to said serial communication unit; when said received character is not password, sending said character back to said serial communication unit.

2. The method of protecting AT commands, as recited in claim 1, wherein said hidden character is "*".

3. A method of protecting AT commands during the interaction between an AT command module of a mobile terminal and a serial communication unit of an external device, comprising the steps of:
   (1) receiving said AT commands from said serial communication unit to said AT command module;
   (2) putting said AT command module into an ID verification mode, wherein said AT command module receives a username and password from said serial communication unit in turn, and verifies said received username and password, comprising the steps of:
      (a) sending information for prompting a user to input a username, and entering into a username input state;
      (b) receiving a character string from said serial communication unit, remotely processing display of said character string according to a flag variable so as to display said inputted character string, and recording said character string as a username;
      (c) sending information for prompting a user to input a password, and entering into a password input state; and
      (d) receiving a character string from said serial communication unit, remotely processing display of said character string according to a flag variable so as to hide said inputted character string, and recording said character string as password; and
   (3) when said ID verification is successful, putting said AT command module into an AT command processing state, wherein both step (b) and (d) comprise steps of:
   reading said received character from a receiving buffer in turn;
   determining whether said received character is password according to said flag variable; when said received character is password, determining whether said character is special character; when said character is not special character, sending a hidden character to said serial communication unit, while when said character is special character, not sending a hidden character to said serial communication unit; when said received character is not password, sending said character back to said serial communication unit.

4. The method of protecting AT commands, as recited in claim 3, wherein said special character includes a carriage return character and/or a line feed character.

5. A method of protecting AT commands during the interaction between an AT command module of a mobile terminal and a serial communication unit of an external device, comprising the steps of:
   (1) receiving said AT commands from said serial communication unit to said AT command module;
   (2) putting said AT command module into an ID verification mode, wherein said AT command module receives a username and password from said serial communication unit in turn, and verifies said received username and password, comprising the steps of:
      (a) sending information for prompting a user to input a username, and entering into a username input state;
      (b) receiving a character string from said serial communication unit, remotely processing display of said character string according to a flag variable so as to display said inputted character string, and recording said character string as a username;
      (c) sending information for prompting a user to input a password, and entering into a password input state; and
      (d) receiving a character string from said serial communication unit, remotely processing display of said character string according to a flag variable so as to hide said inputted character string, and recording said character string as password; and
   (3) when said ID verification is successful, putting said AT command module into an AT command processing state, wherein both step (b) and (d) comprise steps of:
   reading said received character from a receiving buffer in turn;
   determining whether said received character is password according to said flag variable; when said received character is password, determining whether said character is special character; when said character is not special character, sending a hidden character to said serial communication unit, while when said character is special character, setting the flag variable to a non-password state; when the received character is not password, sending said character back to said serial communication unit.

6. The method of protecting AT commands, as recited in claim 5, wherein said special character includes a carriage return character and/or a line feed character.

7. A method of protecting AT commands during the interaction between an AT command module of a mobile terminal and a serial communication unit of an external device, comprising the steps of:
- (1) receiving said AT commands from said serial communication unit to said AT command module;
- (2) putting said AT command module into an ID verification mode, wherein said AT command module receives a username and password from said serial communication unit in turn, and verifies said received username and password, comprising the steps of:
  - (a) sending information for prompting a user to input a username, and entering into a username input state;
  - (b) receiving a character string from said serial communication unit, remotely processing display of said character string according to a flag variable so as to display said inputted character string, and recording said character string as a username;
  - (c) sending information for prompting a user to input a password, and entering into a password input state; and
  - (d) receiving a character string from said serial communication unit, remotely processing display of said character string according to a flag variable so as to hide said inputted character string, and recording said character string as password; and
- (3) when said ID verification is successful, putting said AT command module into an AT command processing state, wherein both step (b) and (d) comprise steps of:
  reading said received character from a receiving buffer in turn;
  determining whether said received character is password according to said flag variable; when said received character is password, sending a Backspace and a hidden character to said serial communication unit.

8. A method of protecting AT commands during the interaction between an AT command module of a mobile terminal and a serial communication unit of an external device, comprising the steps of:
- (1) receiving said AT commands from said serial communication unit to said AT command module;
- (2) putting said AT command module into an ID verification mode, wherein said AT command module receives a username and password from said serial communication unit in turn, and verifies said received username and password, comprising the steps of:
  - (a) sending information for prompting a user to input a username, and entering into a username input state;
  - (b) receiving a character string from said serial communication unit, remotely processing display of said character string according to a flag variable so as to display said inputted character string, and recording said character string as a username;
  - (c) sending information for prompting a user to input a password, and entering into a password input state; and
  - (d) receiving a character string from said serial communication unit, remotely processing display of said character string according to a flag variable so as to hide said inputted character string, and recording said character string as password; and
- (3) when said ID verification is successful, putting said AT command module into an AT command processing state, wherein step (d) further comprises a step of setting said flag variable to a non-password state.

9. A method of protecting a mobile terminal from unauthorized AT commands, comprising a step of:
providing an ID verification function to said mobile terminal, which comprises a step of verifying an ID who is trying to control said mobile terminal from an external device via an AT command,
whereby when said ID is verified successful, said AT command is implemented to said mobile terminal, and when said ID is verified unsuccessful, said AT command is not implemented to said mobile terminal, wherein said verifying ID step comprises steps of verifying a username and verifying a password, wherein Local Echo is unset, wherein when verifying said username, said mobile terminal sends inputted characters back to said external device, and when verifying said password, said mobile terminal sends hidden characters back to said external device.

10. A method of protecting a mobile terminal from unauthorized AT commands, comprising a step of:
providing an ID verification function to said mobile terminal, which comprises a step of verifying an ID who is trying to control said mobile terminal from an external device via an AT command,
whereby when said ID is verified successful, said AT command is implemented to said mobile terminal, and when said ID is verified unsuccessful, said AT command is not implemented to said mobile terminal, wherein said verifying ID step comprises steps of verifying a username and verifying a password, wherein Local Echo is set, when said password being inputted, said mobile terminal sends a Backspace and a hidden character back to said external device when receiving each character, otherwise said mobile terminal does not send any character back to said external device.

11. The method of controlling a mobile terminal via AT commands, as recited in claim 9, wherein said mobile terminal has a flag variable for indicating whether said inputted character is username or password.

12. The method of controlling a mobile terminal via AT commands, as recited in claim 11, wherein said mobile terminal has a flag variable for indicating whether said inputted character is username or password.

* * * * *